Figure 1:
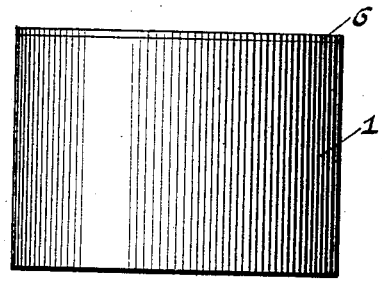

No. 864,113. PATENTED AUG. 20, 1907.
N. SPANICK.
INKSTAND.
APPLICATION FILED NOV. 28, 1906.

WITNESSES:
Jesse C. Miller
R. H. Butler

INVENTOR
Nick Spanick
BY H. C. Everett Co.,
Attorneys

UNITED STATES PATENT OFFICE.

NICK SPANICK, OF LOYALHANNA, PENNSYLVANIA, ASSIGNOR OF ONE-HALF TO AMOS N. PRICE, OF LOYALHANNA, PENNSYLVANIA.

INKSTAND.

No. 864,113.  Specification of Letters Patent.  Patented Aug. 20, 1907.

Application filed November 28, 1906. Serial No. 345,420.

*To all whom it may concern:*

Be it known that I, NICK SPANICK, a subject of the Emperor of Austria, residing at Loyalhanna, in the county of Westmoreland and State of Pennsylvania, have invented certain new and useful Improvements in Inkstands, of which the following is a specification, reference being had therein to the accompanying drawing.

This invention relates to certain new and useful improvements in ink stands, and the invention has for its primary object to provide a novel form of ink stand wherein means is employed for preventing the ink contained therein from being spilled, when the stand is accidentally upset or tilted.

Another object of my invention is to provide an inkwell in which the receptacle is of a size to prevent the same from being easily overturned, but in which the ink-receiving chamber is of a comparatively small area as compared with the chamber area of the receptacle, the said ink-receiving chamber being, however, of sufficient depth to permit of holding a quantity of ink sufficient to obtain the desired amount upon the pen when the latter is dipped therein, thus economically using the ink, and avoiding the objection of exposing a considerable quantity or body of ink to the action of the atmosphere, as is the case in an ordinary ink stand.

Another object of this invention is to provide a simple and durable ink stand having an easily cleansed ink compartment.

Briefly described, my improved stand comprises a suitable receptacle having a funnel shaped cap or lid. In the receptacle is mounted a circular flanged partition providing an ink compartment directly beneath the pen opening of the cap or lid.

The detail construction of my improved ink stand will be hereinafter more fully described and then specifically pointed out in the appended claims, and referring to the drawing forming part of this specification, like numerals of reference designate corresponding parts throughout the several views, in which:—

Figure 2:
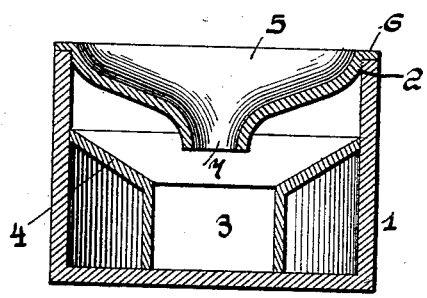
Figure 3:
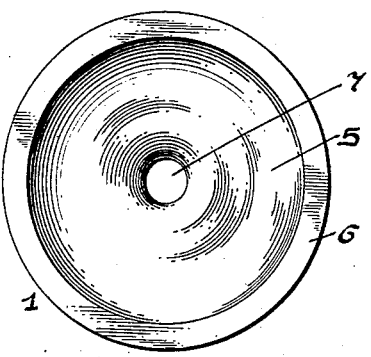

Figure 1 is a side elevation of my improved ink stand, Fig. 2 is a vertical sectional view of the same, Fig. 3 is a plan.

To put my invention into practice, I construct my improved ink stand of a vitreous or metallic material, the stand comprising a cylindrical receptacle 1 having an interiorly threaded upper edge 2. In the receptacle 1 is mounted a circular partition 3 having flanged inclined edges 4 adapted to engage the sides of the receptacle 1 and deflect the contents thereof into the ink compartment formed by the partition 3. A funnel-shaped cap or lid 5 is mounted upon the receptacle 1, the cap or lid being flanged as at 6 to overlie the upper edges of the receptacle 1. The pen opening 7 of said cap or lid is positioned centrally within the receptacle 1 directly above the ink compartment of the partition 3. The circular compartment or chamber formed by the circular partition wall 3, is of considerable less dimensions than the dimensions or area of the space which exists between the inclined edge 4 of said partition 3, and the bottom of the funnel-shaped cap or lid 5. In practice, the compartment inclosed by the circular partition 3, may be completely filled with ink, but the quantity of ink introduced into the well at one time should not be more than enough to fill this compartment, or at least extend only slightly above the same. Thus, in case the well is overturned, a space of considerable greater dimension existing into which the ink may flow, all of the ink will be received in such space instead of any part thereof being discharged through the funnel-shaped cap or lid. The partition 3 and its inclined rim 4 being removable from the receptacle 1, all parts may be effectually cleansed as may be required owing to ink corroding within the receptacle.

It is obvious that various materials may be used for making my improved ink stand, and such changes in the details of construction as are permissible by the appended claims, may be resorted to without departing from the spirit and scope of the invention.

What I claim and desire to secure by Letters Patent, is:—

In an ink well, an outer receptacle having a closed bottom and vertical sides and of uniform thickness throughout and internally threaded at the upper end, an inner receptacle embodying a relatively small central vertical portion bearing upon the bottom of the outer receptacle and with the upper portion thereof flaring outwardly and bearing against the inner surface of the outer receptacle, and a funnel-shaped cap externally threaded to engage the threaded portion of the outer receptacle and with an annular flange bearing over the upper edge of the same, the aperture of the cap terminating above the vertical portion of the inner receptacle and spaced therefrom.

In testimony whereof I affix my signature in the presence of two witnesses.

NICK SPANICK.

Witnesses:
 JOSEPH YATES,
 VINCE TUMA.